June 11, 1968 LE ROY S. WHITMIRE 3,387,962

METHOD OF BENDING AND ANNEALING GLASS SHEETS WITH SUPPLEMENTAL COOLING OF HOTTER AREAS OF THE GLASS

Filed Jan. 11, 1965 2 Sheets-Sheet 1

INVENTOR
LEROY S. WHITMIRE

ATTORNEYS

INVENTOR
LEROY S. WHITMIRE
BY Chisholm and Spencer
ATTORNEYS

United States Patent Office 3,387,962

Patented June 11, 1968

3,387,962

METHOD OF BENDING AND ANNEALING GLASS SHEETS WITH SUPPLEMENTAL COOLING OF HOTTER AREAS OF THE GLASS

Le Roy S. Whitmire, Crystal City, Mo., assignor to Pittsburgh Plate Glass Company, Pittsburgh, Pa., a corporation of Pennsylvania Filed Jan. 11, 1965, Ser. No. 424,778

4 Claims. (Cl. 65—104)

ABSTRACT OF THE DISCLOSURE

Annealing bent glass sheets that have been heated more intensely in one portion than in another portion to produce a non-uniform bend characterized by cooling the bent glass sheets at a non-uniform rate to cool each bent sheet to approximately the top of the annealing range at a more nearly uniform glass temperature followed by controllably cooling the bent glass sheet through the annealing range to below the strain point.

This invention relates to annealing bent glass, and particularly concerns a method of bending and annealing glass sheets wherein glass sheets are bent to desired nonuniform configurations while heat-softened to a nonuniform temperature pattern above the annealing range and then annealed by controlled cooling from the temperature range at which bending takes place to below the annealing point.

Glass sheets are bent in pairs to form bent windshields. After a windshield is bent, it must be annealed and then cooled sufficiently for handling before it can be laminated.

In present commercial production of laminated windshields, glass sheets are mounted in pairs on metal, sectionalized molds having upwardly facing shaping surfaces of outline configuration. The mold end sections are moved to an open position to receive flat glass sheets for bending. The glass-laden molds are conveyed transversely through a tunnel-like bending lehr where the glass is heat-softened.

When the glass is to be bent to nonuniform configuration, it is necessary to apply especially intense heat to the regions to be bent most sharply while simultaneously applying less heat to the regions to be bent less sharply. The glass, upon heat-softening, sags to conform to the upper shaping surface of the skeleton or outline mold and the end sections move into the closed mold position. In the closed mold position, the mold sections provide a substantially continuous, upwardly facing, outline shaping surface conforming to the shape desired in the vicinity of the periphery of the glass sheet to be bent.

The bent glass sheets are supported adjacent their periphery by the upward facing shaping surface of the mold. After bending, the bent glass sheets are annealed by controlled cooling as they are conveyed through an annealing zone having successive regions of controlled temperature. The temperature of each successive region in the annealing zone traversed by the bent glass sheets is lower than that of its preceding region in the annealing zone. The present invention provides a novel cooling treatment of nonuniformly heated bent glass sheets.

It is well known in glass technology that nonuniformly cooling a body of glass which has been heated to above its annealing range causes the glass to assume a physical condition in which regions thereof are stressed in tension and other regions are stressed in compression. The stress distribution resulting from cooling bent glass sheets through the annealing range (approximately 1060 degrees Fahrenheit to 950 degrees Fahrenheit for commercial plate, sheet or float glass) while supported near their margin by an outline mold produces compressive stress at the exposed edge surfaces and tension stress interiorly thereof in the portions contacting the outline mold and/or sufficiently close thereto to have their cooling rates retarded thereby. This result is motivated by the fact that when a glass sheet is cooled nonuniformly through the annealing range, those portions that cool to the strain point first become stressed in compression and those portions that cool to the strain point later become stressed in tension when the glass continues to cool below the annealing range to a lower uniform temperature without being reheated above the strain point. For the purpose of this discussion, the strain point is at the bottom of the annealing range.

Glass windshields, particularly their peripheral edge, have been found to be more capable of withstanding normal stresses resulting from handling and installation when the regions subject to the greatest mechanical stresses (their marginal edges) are stressed in compression rather than in tension. It has become desirable in the formation of curved automobile windshields to improve the inherent residual stress characteristics of the edge of the glass sheets by imparting compressive stress along the entire edge, thus giving a greater resistance to breakage or chipping along the edge during handling and installation. At the same time, since glass is weak when stressed in tension, it is also desirable to limit the maximum tension stress in the glass.

In the past, difficulty was met in establishing compression stress of sufficient magnitude along the edge portion of nonuniformly bent glass sheets to overcome the mechanical forces tending to impose tension stresses that induced breakage during handling and installation.

It is the primary object of the present invention to provide a method and apparatus for bending and annealing glass sheets of nonuniform curvature to conform to the shape of an outline mold while simultaneously controlling and improving the permanent stress patterns along the edge portions of the bent sheets, particularly in their sharply bent regions.

According to the present invention, immediately after bending, the nonuniformly heated bent glass sheets are cooled at a nonuniform, relatively rapid cooling rate from the nonuniform temperature at which they are bent to approximately the top of the annealing range by exposing the hotter, more sharply bent regions of the nonuniformly bent glass to blasts of relatively strong and relatively cold fluid while the less hot, less sharply bent regions of the nonuniformly bent glass are subjected to relatively weak and relatively warm fluid resulting from the dissipation and heating of the fluid blasts. When the glass temperature reaches the top of the annealing range, the entire sheets are exposed to flow of fluid at a temperature slightly below the glass temperature and ranging from slightly above to slightly below the strain point to cool the glass at a relatively slow rate of cooling through the annealing range.

The present invention has determined that applying relatively cooler fluid against the hotter, sharply bent regions of bent glass and the portions of the mold that support the sharply bent regions reduces tension stress in the sharply bent region of the glass. Therefore, the glass is much more capable of withstanding the handling and installation that take place in an automotive assembly plant or when windshields are being replaced.

The present invention will be better understood in the light of a description of an illustrative embodiment of apparatus in which the present invention is employed.

In the drawings forming part of the description of this illustrative apparatus,

Figure 1:
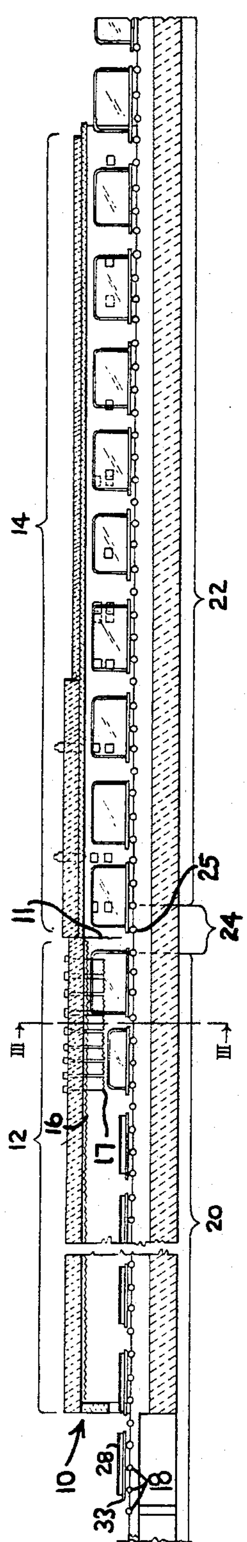
FIG. 1 is a schematic representation of a longitudinal section through a tunnel-type bending and annealing lehr used to practice the present invention.

Referring in detail to the drawings, and particularly to FIG. 1, a lehr 10 is constructed of refractory materials in the form of an elongated, tunnel-like structure substantially rectangular in cross section. The lehr is divided by a suitable partition 11, formed by suspending strips of flexible heat-resistant material, such as fiber glass or asbestos, into a bending zone 12 and an annealing zone 14. The bending zone 12 and/or the annealing zone 14 may, if desired, be subdivided into further distinct zones (not shown) for the purpose of isolating the ambient conditions within the subdivided zones.

The bending zone 12 is provided with a plurality of primary heating devices 16 which may be of any well-known construction. Preferably, the primary heating devices 16 are electric resistance elements disposed in groups along the length of the bending zone 12. Each device is independently controllable by known electrical control means (not shown) as to the amount of heat generated. Additionally, auxiliary heaters 17, such as those disclosed in U.S. Patent No. 2,794,300, issued on June 4, 1957, to James S. Golightly, are provided in the bending zone 12 to provide especially intense localized heat as required. These auxiliary heaters are generally known in the bending art as "crease" heaters.

A conveyor 18 comprises a plurality of parallel horizontal conveyor rolls extending transversely from wall to wall of the lehr. The conveyor is divided into a bending zone conveyor section 20 extending from a loading station to the end of the bending zone 12 and an annealing zone conveyor section 22 extending through the annealing zone. Other conveyor rolls 24 that are not power driven form a short intermediate conveyor section 25 therebetween. The bending zone conveyor section 20 and the annealing zone conveyor section 22 are driven at independent speeds.

The intermediate conveyor section 25 may comprise conveyor rolls 24 other than idle conveyor rolls that may be driven through an overrunning clutch arrangement to couple the intermediate conveyor section 25 to either the bending conveyor section 20 or the annealing conveyor section 22 to transfer a mold from the bending zone to the annealnig zone as rapidly as possible.

Figure 3:
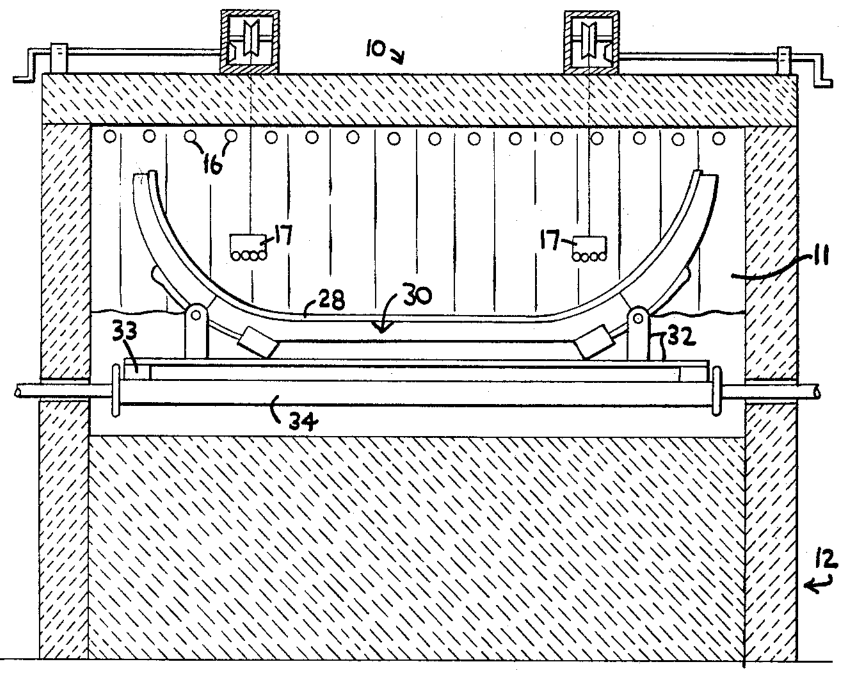
FIGS. 3 and 4 are cross-sectional views of the bending zone and the annealing zone taken along the lines III—III and IV—IV, respectively.
Figure 4:
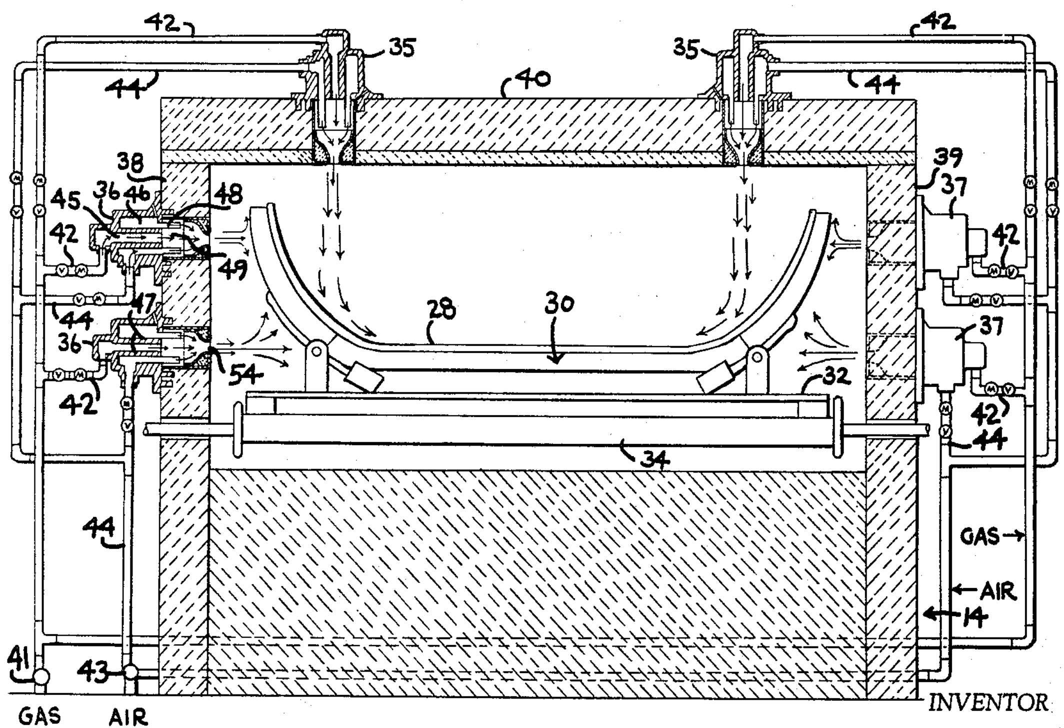

Glass sheets 28 are supported on a plurality of bending molds 30. Usually, for bending glass to complicated shapes invloving a sharply bent portion and a relatively shallow portion, it is necessary to sectionalize the molds. Hence, the bending molds 30 are of the sectionalized outline type which support one or more glass sheets 28 to be bent adjacent its marginal perimeter. Each mold is securely mounted upon a mold carriage 32 as shown in FIG. 3.

Each mold carriage 32 is provided with a pair of elongated runners 33 extending laterally adjacent each longitudinal extremity thereof. The mold runners 33 rest upon a series of rollers 34 which comprise each of the conveyor sections. As the conveyor rollers 34 are rotated in unison, the mold carriages 32 and the molds 30 supporting glass sheets 28 are propelled forward through the bending zone 12 and the annealing zone 14. The runners 33 are longer than the intermediate conveyor section 25 to facilitate transfer of the mold from the bending zone 12 to the annealing zone 14.

In a typical commercial operation, a pair of glass sheets 28 are mounted on a bending mold 30. The molds are transported laterally through the tunnel-like lehr 10.

The sheets are heated while traversing the bending zone 12 until at the last region of the bending zone containing the auxiliary heating elements 17, the longitudinal extremity regions of the glass are heated more intensly than the intermediate regions of the glass to produce the nonuniform bends desired. Thus, glass sheets traversing the intermediate conveyor section 24, on being transferred into the annealing zone 14 of the lehr 10, are of nonuniform temperature with their sharply bent end regions hotter than their intermediate regions.

The metal of the outline molds 30 is at a lower temperature than that of the glass on traversing the intermediate conveyor section. The higher thermal capacity of the metal mold than that of glass causes the mold to change its temperature at a slower rate than of the glass in response to a temperature change in the atmosphere to which the glass-laden mold is exposed. This temperature difference between the glass and the supporting part of the mold is greatest in the longitudinal extremity portions of the glass sheet which have been heated most intensely. Hence, these regions are most susceptible of developing permanent tension stress upon attaining a uniform temperature below the strain point. The present invention provides novel structure in the annealing zone to remedy the stress problems introduced into the glass because of these differences in temperature between various regions of the glass and between the glass and the mold.

When the glass-laden mold enters the annealing zone, the temperature of the supported bent glass ranges between about 1100 degrees Fahrenheit for its central portion to about 1200 degrees Fahrenheit for its sharply bent end rgeions, which are bent upwards from the substantially horizontally oriented central region. The purpose of the present invention is to cool the glass rapidly and nonuniformly to the upper end of the annealing range, approximately 1060 degrees Fahrenheit, for commercial plate sheet or float glass, then, relaitvely slowly at a more nearly uniform rate of cooling through the annealing range (between about 1060 degrees Fahrenheit to 950 degrees Fahrenheit) to obtain the desired stress pattern.

When the glass temperature reaches 950 degrees Fahrenheit, the rate of cooling is accelerated again by subjecting the glass to blasts from burners at lower temperatures. This procedure makes it possible to stress the windshield properly and, at the same time, maintain high production speeds.

In apparatus for performing the above method where the maximum curvature in windshields is near the end, gas burners 35, aligned with auxiliary heaters 17 longitudinally of the axis of mold movement through lehr 10, extend downward through the roof of the lehr in vertical planes extending longitudinally of the lehr, and additional gas burners 36 and 37 extend laterally inward through the side walls 38 and 39 of the annealing lehr to direct mixtures of excess air and combustion products of gas and air toward the ends of the glass and the hotter portions of the supporting mold. The burners direct a mixture of excess air and combustion products to agitate the atmosphere within the annealing section, to help accelerate the rate of cooling of the glass and the supporting mold in a nonuniform fashion in such a manner that the glass regions closest to the burner orifices are affected most severely with decreasing effect for those glass regions remote from the orifices.

The gas burners are arranged in sets of burners A through M spaced longitudinally along the length of the portion of the annealing zone wherein the glass temperature is reduced to below the strain point. Some sets include one or more burners 36 and/or 37 extending horizontally inward from one or both sides only. Some sets include roof burners 35 extending vertically downward. All the burners in the annealing zone are constructed and arranged to direct blasts of fluid comprising mixtures of air and combustion products at high velocity toward the end regions of the glass most sharply bent.

The fluid blasts directed horizontally from the burners 36 and 37 disposed through the opposite side walls of the annealing zone have a maximum cooling effect on the end regions against which they impinge directly. The velocity of horizontal fluid flow decreases with increasing lateral distance from the side walls 38 and 39.

The fluid blasts that impinge on the end regions of the glass continue to move inward against the undersurface of the bent glass at a decelerating rate of speed and at a temperature that increases toward the transverse center of the annealing zone because of heat exchange from the relatively hot glass.

The downwardly directed fluid blasts applied against the upper surface of the bent glass by the burners 35 locally cool the sharply bent regions against which they impinge to a greater extent than the glass regions contacted by these fluid blasts after the latter are heated upon initial contact with the hot glass, their velocity diminished with increasing distance from the nozzle orifice of the high speed gas burner and their direction diverted by contact with the upper glass surface to these other regions.

The effect of applying several blasts of fluids at different locations along the length of the annealing zone at different temperatures and in horizontal and vertical directions at high velocity toward a series of spaced, bent glass sheets causes a turbulent flow of fluid through which the sheets are conveyed. This turbulence helps avoid stratification of temperature in the critical portion of the annealing zone of the lehr where the glass temperature is reduced to slightly below the strain point. Thus, the turbulence helps avoid factors inimical to adequate control of the rate of cooling glass sheets as they traverse the annealing zone after nonuniform bending.

The gas is supplied in controlled and measured amounts from a gas main 41 having a damper (not shown) to individual gas lines 42. An air line 43 supplies air under pressure in controlled amount from a compressor (not shown) to individual air lines 44. Gas from gas main 41 is supplied to a central chamber 45 for each gas burner 35, 36, and 37. Air from air line 44 is supplied to an air chamber 46 completely surrounding central chamber 45. A common wall 47 of cylindrical configuration is apertured a sufficient amount to transfer enough air to the central chamber 45 from air chamber 46 to form a combustible air-gas mixture. The remaining air is transmitted through a series of pipes 48 circumferentially arranged about a combustion chamber 49.

The gas in the mixture formed at the front end of the central gas chamber 45 is fully burned in the rear portion of the combustion chamber 49 containing the air pipes 48. The combustion products formed by the complete oxidation of the gas in the rear portion of combustion chamber 49 mixes with the air passing through air pipes 48 to cool the air-gas mixture to a desired temperature.

Each gas burner has an orifice 54 of decreasing cross-section in the direction of fluid flow to accelerate the flow of the blasted mixture of air and combustion products leaving the gas burner to insure that the fluid blasts have a "throw" sufficient to agitate the lehr atmosphere as well as to impinge with force on the glass regions whose temperature is desired to be affected to a maximum extent. Each burner 35, 36, and 37 is composed of a refractory material in the form of a hollowed out block encased in an open-ended box of 1/8 inch thick stainless steel and of rectangular cross-section fitting snugly into apertures of the lehr walls 38 and 39 and the lehr roof 40.

To properly control and monitor the rate of flow of combustible mixture to each gas burner, a valve V and a manometer M may be installed in each individual gas line 42. Each branch air line 44 may also be provided with a valve V and a manometer M to control and monitor the rate of air flow to air chamber 46 and pipes 48.

In a lehr having a width of 7½ feet and a height of 2 feet a typical system for air flow and rate of gas supplied to gas burners in the critical lehr region will be described.

Table I discloses the temperature of the fluid supplied through the various sets of burners in a particular arrangement of these sets employed commercially. The notation "Air" indicates air pressure supplied in units of inches of water column. The gas pressure figures are manometer factors using a North American No. 80 orifice usable with a North American burner Series 4423 XSA manufactured by the North American Manufacturing Company, Cleveland, Ohio, and modified by drilling 16 equiangularly spaced holes of .1200 inch diameter 1¼ inches from the front end of common wall 47. The 16 holes in common wall 47 were sufficient to transfer enough air into the gas chamber 45 to result in a fully combustible mixture for the rates of air flow and gas flow used.

Figure 2:
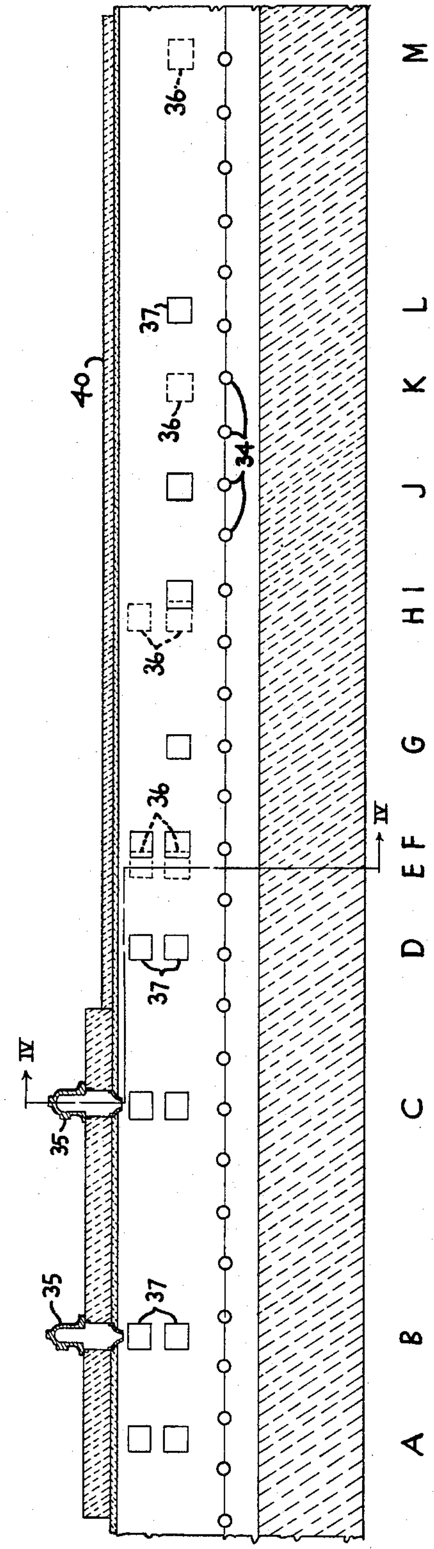
FIG. 2 is an enlarged longitudinal elevtaion of a portion of the annealing portion of the lehr in which the present invention is employed.

The following table records the settings for air pressure and gas pressure for the burners located at the various locations along the length of the annealing zone to provide the temperature control desired by the present invention. The roof burners were located about 15 inches inward of the side walls, the upper side burners were located about 20 inches above the level of the conveyor and the lower side burners about 10 inches above the level of the conveyor. Sets of burners were spaced longitudinally along a conveyor length of about 28 feet as shown to scale in FIGS. 1 and 2.

TABLE I.—BURNER SETTINGS

| Set | Burner Location | Left Side | | | Right Side | | |
|---|---|---|---|---|---|---|---|
| | | Air | Gas | Temp., ° F. | Air | Gas | Temp., ° F. |
| A | Upper side | 8 | .53 | 700 | 8 | .53 | 700 |
| | Lower side | 8 | .53 | 700 | 8 | .53 | 700 |
| B | Roof | 9 | 1.04 | 1,000 | 9 | 1.04 | 1,000 |
| | Upper side | 8 | .53 | 700 | 8 | .53 | 700 |
| | Lower side | 8 | .53 | 700 | 8 | .53 | 700 |
| C | Roof | 8 | .96 | 1,000 | 8 | .96 | 1,000 |
| | Upper side | 4 | .70 | 1,050 | 4 | .70 | 1,050 |
| | Lower side | 5 | .66 | 950 | 5 | .66 | 950 |
| D | Upper side | Right side only | | | 7 | .88 | 1,000 |
| | Lower side | | | | 8 | .88 | 950 |
| E | Upper side | 7 | .88 | 1,000 | Left side only | | |
| | Lower side | 8 | .88 | 950 | | | |
| F | Upper side | Right side only | | | 7 | .88 | 1,000 |
| | Lower side | | | | 8 | .88 | 950 |
| G | | Not in use | | | | | |
| H | Upper side | 8 | .66 | 800 | Left side only | | |
| | Lower side | 8 | .66 | 800 | | | |
| I | Lower side | Right side only | | | 8 | .53 | 700 |
| J | | Not in use | | | | | |
| K | Lower side | 8 | .53 | 700 | Left side only | | |
| L | Lower side | Right side only | | | 8 | .53 | 700 |
| M | Lower side | 8 | .53 | 700 | Left side only | | |

Another typical arrangement for using the burners for another productive pattern in the same lehr is reported in Table II, which follows:

TABLE II.—BURNER SETTINGS

| Set | Burner Location | Left Side | | | Right Side | | |
|---|---|---|---|---|---|---|---|
| | | Air | Gas | Temp., ° F. | Air | Gas | Temp., ° F. |
| A | Upper Side | 7 | .42 | 650 | 7 | .42 | 650 |
| | Lower Side | 7 | .42 | 650 | 7 | .42 | 650 |
| B | Roof | 7 | .54 | 750 | 7 | .54 | 750 |
| | Upper Side | 7 | .54 | 750 | 7 | .54 | 750 |
| | Lower Side | 7 | .54 | 750 | 7 | .54 | 750 |
| C | Roof | 7 | .74 | 900 | 7 | .74 | 900 |
| | Upper Side | 4 | .48 | 850 | 4 | .48 | 850 |
| | Lower Side | 6 | .60 | 850 | 6 | .60 | 850 |
| D | Upper Side | Right side only | | | 7 | .60 | 800 |
| | Lower Side | | | | 8 | .66 | 800 |
| E | Upper Side | 7 | .47 | 700 | Left side only | | |
| | Lower Side | 8 | .66 | 800 | | | |
| F | Upper Side | Right side only | | | 7 | .47 | 700 |
| | Lower Side | | | | 8 | .66 | 800 |
| G | Lower Side | 8 | .66 | 800 | 8 | .66 | 800 |
| H | Upper Side | 7 | .47 | 700 | Left side only | | |
| | Lower Side | 8 | .66 | 800 | | | |
| I | Lower Side | Right side only | | | 7 | .47 | 700 |
| J | Lower Side | 7 | .47 | 700 | 7 | .47 | 700 |
| K | Lower Side | 7 | .47 | 700 | Left side only | | |
| L | Lower Side | Right side only | | | 7 | .47 | 700 |
| M | Lower Side | 7 | .47 | 700 | Left side only | | |

While a particular embodiment and various sets of conditions illustrating the present invention have been described for purposes of illustration, it is understood that the present invention is subject to various changes that may be made without departing from the spirit of the invention as defined in the claimed subject matter which follows.

What is claimed is:

1. A method of bending and annealing glass sheets comprising heating a glass sheet to non-uniform temperature above the annealing range wherein a glass sheet portion to be bent relatively sharply is heated to a higher temperature than another portion to be bent less sharply, shaping said sheet to a desired non-uniform configuration while heat-softened to a non-uniform temperature and then annealing said bent sheet by controlled cooling from the non-uniform temperature range at which bending takes place to below the annealing point, wherein the bent glass sheet is cooled at a non-uniform, rapid, cooling rate from said non-uniform temperature to approximately the top of the annealing range by exposing the relatively hot, more sharply bent regions of the non-uniformly bent glass sheet to blasts of relatively strong and relatively cold fluid substantially below the strain point while the less sharply bent regions of the non-uniformly bent glass sheet are exposed to ambient temperature above the strain point to cool the glass sheet to a more nearly uniform temperature above the strain point, then exposing the entire sheet to flow of a fluid at a temperature slightly below the glass temperature and (ranging from slightly above to) slightly below the strain point until the glass is cooled to approximately the strain point to cool the sheet at a relatively slow rate through the annealing range.

2. A method of bending and annealing glass sheets wherein a glass sheet is supported in bending relation to a shaping surface of an outline mold whose thermal capacity is different from glass and which has an upwardly facing shaping surface of nonuniform concave curvature formed thereon comprising heating said glass sheet to nonuniform temperature above the annealing range while supported on said outline mold, shaping said sheet into conformity with said shaping surface while heat-softened, cooling the bent glass sheet at a nonuniform, rapid rate of cooling from said nonuniform temperature to approximately the top of the annealing range by exposing the more sharply bent regions of the nonuniformly bent glass and the portions of the mold supporting said more sharply bent regions to relatively strong and relatively cold blasts of fluid substantially below the strain point while the less sharply bent regions of the bent glass sheet and the portions of the mold supporting said less sharply bent regions are exposed to ambient temperature above the strain point until the glass temperature is near the top of the annealing range, then exposing said glass sheet and said mold to flow of a fluid at a temperature slightly below the glass temperature and ranging from slightly above to slightly below the strain point until the glass is cooled to approximately the strain point to cool the sheet at a relatively slow rate through the annealing zone.

3. A method as in claim 2, wherein said last exposing step comprises applying successive flows of fluid toward the glass at temperatures ranging from slightly above to slightly below the strain point with each flow of fluid colder than its immediately preceding flow.

4. A method as in claim 3, further including exposing the glass to an atmosphere having a temperature only below the strain point after the glass cools to the strain point.

References Cited

UNITED STATES PATENTS 3,114,571 12/1963 Carson et al. ______ 65—103 X

S. LEON BASHORE, *Acting Primary Examiner.*

DONALL H. SYLVESTER, *Examiner.*

A. D. KELLOGG, *Assistant Examiner.*